United States Patent
Lee et al.

(10) Patent No.: US 12,299,851 B2
(45) Date of Patent: May 13, 2025

(54) METHOD AND APPARATUS WITH IMAGE PREPROCESSING

(71) Applicant: SAMSUNG ELECTRONICS CO., LTD., Suwon-si (KR)

(72) Inventors: Jaeyun Lee, Suwon-si (KR); Kyuhong Kim, Seoul (KR); Sungun Park, Suwon-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 357 days.

(21) Appl. No.: 17/862,568

(22) Filed: Jul. 12, 2022

(65) Prior Publication Data

US 2023/0030937 A1 Feb. 2, 2023

(30) Foreign Application Priority Data

Jul. 29, 2021 (KR) .................. 10-2021-0099845
Sep. 17, 2021 (KR) .................. 10-2021-0124909

(51) Int. Cl.
*G06T 5/70* (2024.01)
*G06T 5/10* (2006.01)
*G06V 40/12* (2022.01)

(52) U.S. Cl.
CPC .................. *G06T 5/70* (2024.01); *G06T 5/10* (2013.01); *G06V 40/1347* (2022.01)

(58) Field of Classification Search
CPC .......... G06V 40/1347; G06V 40/1335; G06V 40/1365; G06V 10/751; G06V 40/1376; G06V 10/478; G06V 10/20; G06V 10/30; G06V 10/82; G06V 40/1388; G06T 5/70; G06T 5/10
USPC ............................................ 382/275
See application file for complete search history.

(56) References Cited

U.S. PATENT DOCUMENTS

| | | | | |
|---|---|---|---|---|
| 6,990,252 | B2 * | 1/2006 | Shekter | G06V 10/30 358/463 |
| 6,990,453 | B2 * | 1/2006 | Wang | G10L 17/26 704/E15.045 |
| 9,330,325 | B2 | 5/2016 | Shin et al. | |
| 11,527,100 | B2 * | 12/2022 | Hwang | G06F 16/532 |

(Continued)

FOREIGN PATENT DOCUMENTS

| | | |
|---|---|---|
| CN | 104361319 A | 2/2015 |
| CN | 112329518 A | 2/2021 |

(Continued)

OTHER PUBLICATIONS

Yin, Dong, et al. "A fourier perspective on model robustness in computer vision." *Advances in Neural Information Processing Systems* vol. 32 (2019). pp. 1-11.

(Continued)

*Primary Examiner* — Negussie Worku
(74) *Attorney, Agent, or Firm* — NSIP Law

(57) ABSTRACT

A processor-implemented method with image preprocessing includes: transforming a fingerprint image into a frequency domain; suppressing a low-frequency region corresponding to a first noise component of the fingerprint image in the frequency domain; and restoring the frequency domain, in which the low-frequency region is suppressed, as an image.

28 Claims, 13 Drawing Sheets

(56) References Cited

U.S. PATENT DOCUMENTS

| | | | | |
|---|---|---|---|---|
| 2007/0055500 | A1* | 3/2007 | Bilobrov | G06F 16/634 |
| | | | | 707/E17.101 |
| 2007/0297655 | A1* | 12/2007 | Monden | G06V 10/50 |
| | | | | 382/125 |
| 2016/0379038 | A1* | 12/2016 | Vural | G06V 10/993 |
| | | | | 382/125 |
| 2018/0285618 | A1* | 10/2018 | Feng | G06V 40/1376 |
| 2018/0365479 | A1* | 12/2018 | Lee | G06V 40/1335 |
| 2020/0184171 | A1* | 6/2020 | Lee | G06V 40/1376 |
| 2020/0218868 | A1* | 7/2020 | Kim | G06V 40/1306 |
| 2022/0012463 | A1* | 1/2022 | Hwang | G06F 16/532 |
| 2022/0198824 | A1* | 6/2022 | Niaf | G06V 10/82 |

FOREIGN PATENT DOCUMENTS

| | | |
|---|---|---|
| JP | 4237145 B2 | 3/2009 |
| KR | 10-0675000 B1 | 1/2007 |
| KR | 10-2020-0070878 A | 6/2020 |
| KR | 10-2021-0024310 A | 3/2021 |
| KR | 10-2021-0025247 A | 3/2021 |

OTHER PUBLICATIONS

Wang, Zifan, et al. "Towards frequency-based explanation for robust cnn." *arXiv preprint arXiv*:2005.03141 May 6, 2020. pp. 1-7.

Lv, Bochen, et al. "A frequency domain analysis of gradient-based adversarial examples." *ICLR 2021 Conference* Mar. 5, 2021. pp. 1-16.

* cited by examiner

METHOD AND APPARATUS WITH IMAGE PREPROCESSING

CROSS-REFERENCE TO RELATED APPLICATIONS

This application claims the benefit under 35 USC § 119 (a) of Korean Patent Application No. 10-2021-0099845, filed on Jul. 29, 2021, and Korean Patent Application No. 10-2021-0124909, filed on Sep. 17, 2021, in the Korean Intellectual Property Office, the entire disclosures of which are incorporated herein by reference for all purposes.

BACKGROUND

1. Field

The following description relates to a method and apparatus with fingerprint image preprocessing.

2. Description of Related Art

Technology for security authentication of biometric information may be implemented with smartphones and various mobile and wearable devices. Since authentication through biometric information is convenient and easy to access, biometrics authentication may be used. For example, among such forms of technology, fingerprint recognition technology may be used due to a high level of convenience, security, and economic feasibility. Generally, fingerprint recognition, user authentication, or verification may be performed by obtaining a fingerprint image of a user through a sensor and comparing the obtained fingerprint image to a pre-enrolled fingerprint image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with image preprocessing includes: transforming a fingerprint image into a frequency domain; suppressing a low-frequency region corresponding to a first noise component of the fingerprint image in the frequency domain; and restoring the frequency domain, in which the low-frequency region is suppressed, as an image.

The method may include receiving the fingerprint image.

The transforming may include transforming the fingerprint image into the frequency domain by a transformation method that matches statistical noise features in the fingerprint image.

The transforming may include transforming the fingerprint image into the frequency domain by either one or both of a Fourier transform method and a wavelet transform method.

The suppressing of the low-frequency region may include: detecting the low-frequency region corresponding to the first noise component found in the frequency domain; and suppressing the detected low-frequency region.

The detecting of the low-frequency region may include detecting the low-frequency region lower than a frequency band corresponding to a fingerprint region in the frequency domain.

The suppressing of the low-frequency region may include masking the detected low-frequency region with a statistically representative value.

The method may include: determining whether noise comprised in the fingerprint image exceeds a threshold; and suppressing a high-frequency region corresponding to a second noise component caused by a device, to obtain the fingerprint image in the frequency domain, in response to the noise exceeding the threshold.

The determining of whether the noise exceeds the threshold may include determining whether the noise exceeds the threshold based on whether a standard deviation of pixel values of the fingerprint image exceeds the threshold.

The suppressing of the high-frequency region may include: detecting the high-frequency domain corresponding to the second noise component in the frequency domain; and suppressing the detected high-frequency domain.

The detecting of the high-frequency region may include detecting the high-frequency domain higher than a frequency band corresponding to a region corresponding to a fingerprint, based on an aspect of variants of the fingerprint image caused by the device in the frequency domain.

The suppressing of the high-frequency domain may include masking a power of the detected high-frequency domain with a median power value of a power spectrum of the fingerprint image, and the median power value may correspond to a power at a position of the high-frequency region in the frequency domain.

In another general aspect, one or more embodiments include a non-transitory computer-readable storage medium storing instructions that, when executed by one or more processors, configure the one or more processors to perform any one, any combination, or all operations and methods described herein.

In another general aspect, a processor-implemented method with image preprocessing includes: transforming a fingerprint image into a frequency domain; separating a first noise component of the fingerprint image and a second noise component caused by a device, through a statistical analysis of the frequency domain; first masking a low-frequency region corresponding to the first noise component in the frequency domain; second masking a high-frequency region corresponding to the second noise component in the frequency domain; and generating a restored fingerprint image based on the first masked frequency domain and the second masked frequency domain.

The method may include: receiving the fingerprint image; and outputting the restored fingerprint image.

The first masking may include first masking the low-frequency region having a lower frequency than a frequency band corresponding to a fingerprint region in the frequency domain with a statistical representative value.

The second masking may include masking a power of the high-frequency region having a higher frequency than a frequency band corresponding to a fingerprint region in the frequency domain with a median power value of a power spectrum of the fingerprint image, the median power value corresponding to a power at a position of the high-frequency region in the frequency domain.

In another general aspect, an apparatus with image preprocessing includes: one or more processors configured to: transform a fingerprint image into a frequency domain; suppress a low-frequency region corresponding to a first noise component of the fingerprint image in the frequency domain; and restore the frequency domain, in which the low-frequency region is suppressed, as an image.

The apparatus may include: a sensor configured to detect the fingerprint image; and a communication interface configured to output the restored image.

For the suppressing of the low-frequency region, the one or more processors may be configured to: detect the low-frequency region lower than a frequency band corresponding to a fingerprint region in the frequency domain; and mask the detected low-frequency region with a statistically representative value.

The one or more processors may be configured to: determine whether noise comprised in the fingerprint image exceeds a threshold; and suppress a high-frequency region corresponding to a second noise component caused by a device, to obtain the fingerprint image in the frequency domain, based on a determination that the noise exceeds the threshold.

For the determining of whether the noise exceeds the threshold, the one or more processors may be configured to determine whether the noise exceeds the threshold based on whether a standard deviation of pixel values of the fingerprint image exceeds the threshold.

For the suppressing of the high-frequency region, the one or more processors may be configured to detect the high-frequency region higher than a frequency band corresponding to a fingerprint region and mask a power of the high-frequency region with a median power value of a power spectrum of the fingerprint image, the median power value corresponding to a power at a position of the high-frequency region in the frequency domain, based on an aspect of variants of the fingerprint image caused by a device in the frequency domain.

In another general aspect, a processor-implemented method with image preprocessing includes: suppressing, in response to transforming a biometric image into a frequency domain, a low-frequency region corresponding to a first noise component in the frequency domain; determining, by comparing noise comprised in the biometric image to a threshold, whether to suppress a high-frequency region corresponding to a second noise component in the frequency domain; and restoring the frequency domain, in which either the low-frequency region or the low-frequency region and the high-frequency region is suppressed, as a restored biometric image.

The determining of whether to suppress the high-frequency region may include suppressing the high-frequency region in response to the noise comprised in the biometric image exceeding the threshold; and the restoring of the frequency domain may include restoring the frequency domain, in which the low-frequency region and the high-frequency region is suppressed, as the restored biometric image.

The suppressing of the high-frequency region may include: determining a signal-to-noise ratio (SNR) of the biometric image based on a standard deviation of pixel values of the biometric image; and suppressing the high-frequency region in response to the SNR exceeding the threshold.

The method may include determining whether a biometric of the biometric image is spoofed by applying the restored biometric image to one or more neural networks.

The biometric image may be a fingerprint image.

Other features and aspects will be apparent from the following detailed description, the drawings, and the claims.

Figure 1:
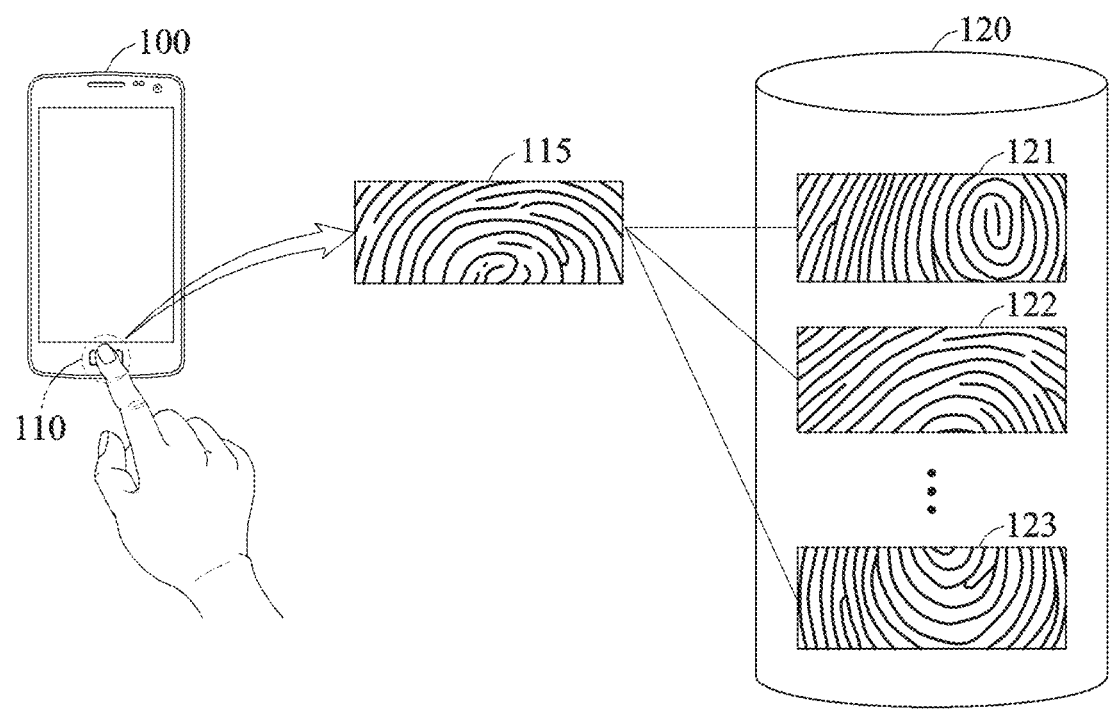
FIG. 1 illustrates an example of an environment using a fingerprint image.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms such as "first," "second," and "third" are used to explain various members, components, regions, layers, or sections, these members, components, regions, layers, or sections are not to be limited by these terms. Rather, these terms should be used only to distinguish one member, component, region, layer, or section from another member, component, region, layer, or section. For example, a "first" member, component, region, layer, or section referred to in the examples described herein may also be referred to as a "second" member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of an environment using a fingerprint image. Referring to FIG. 1, an electronic device 100 including a sensor 110 and a fingerprint enrollment database (DB) 120 including enrolled fingerprint images 121, 122, and 123 are illustrated. Hereinafter, for the convenience of explanation, an example of a user's biometric information is described as a fingerprint image, but is not necessarily limited thereto. In addition or as an alternative to the fingerprint image, the biometric information may include a variety of information such as an iris image, a palm image, and/or a face image.

The electronic device 100 may obtain an input fingerprint image 115 representing a fingerprint of a user through the sensor 110. The sensor 110 may be, for example, an ultrasonic fingerprint sensor that captures a user's fingerprint, an optical fingerprint sensor, an electrostatic fingerprint sensor, and/or an image sensor, but is not necessarily limited thereto. The sensor 110 may be, as a non-limiting example, a fingerprint sensor 410 illustrated in FIG. 4 and/or a sensor 1310 illustrated in FIG. 13.

Fingerprint enrollment may be performed for fingerprint recognition. The enrolled fingerprint images 121, 122, and 123 may be stored in advance in the fingerprint enrollment DB 120 through a fingerprint enrollment process. For personal information protection, the fingerprint enrollment DB 120 may store features extracted from the enrolled fingerprint images 121, 122, and 123, instead of storing the enrolled fingerprint images 121, 122, and 123 without any changes. The fingerprint enrollment DB 120 may be stored in a memory (a memory 1350 of FIG. 13, as a non-limiting example) included in the electronic device 100 or an external device such as a server or a local cache that may communicate with the electronic device 100.

When the input fingerprint image 115 is received for authentication, the electronic device 100 may authenticate the input fingerprint image 115 of a user using a similarity between an input fingerprint shown in the input fingerprint image 115 and enrolled fingerprints shown in the enrolled fingerprint images 121, 122, and 123, and/or detect whether the input fingerprint image 115 is spoofed or not. Here, that the fingerprint image 115 is "spoofed" may mean the fingerprint image 115 is of fake biometric information other than live biometric information and may be construed as including, for example, duplication, forgery, and/or falsification of biometric information.

To be described in detail hereinafter, the electronic device 100 may determine whether an input fingerprint may be authenticated or forged, based on a plurality of unspecified real fingerprint features provided in advance, a plurality of unspecified fake fingerprint features provided in advance, and/or enrolled fingerprint features of a user of a device.

Figure 2:
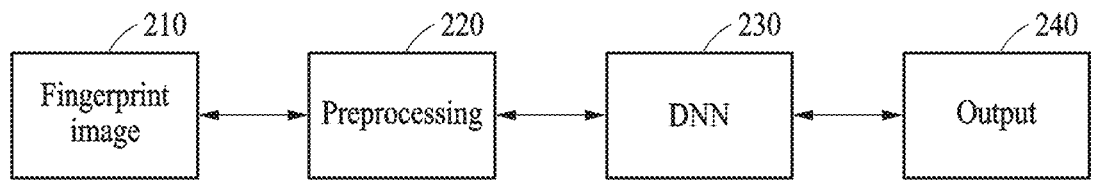
FIG. 2 illustrates an example of performing preprocessing on a fingerprint image.

FIG. 2 illustrates an example of performing preprocessing on a fingerprint image. Referring to FIG. 2, a process of outputting 240 whether a fingerprint is spoofed by applying an image as a result of performing preprocessing 220 on a fingerprint image 210 to a deep neural network (DNN) 230 is illustrated.

In an example, the DNN 230 may include a large number of nodes connected by line-shaped edges. The nodes may be interconnected through the edges having connection weights. A connection weight may be a predetermined value of edges and may be referred to as a "synaptic weight" or a "connection intensity." The DNN 230 may include, for example, an input layer, a hidden layer (e.g., one or more hidden layers), and an output layer. Each of the input layer, the hidden layer, and the output layer may include a plurality of nodes. A node included in the input layer may be referred to as an "input node," a node included in the hidden layer may be referred to as a "hidden node," and a node included in the output layer may be referred to as an "output node." The input layer may receive an input for performing training or recognition and may transmit the input to the hidden layer. The output layer may generate an output of the DNN 230 (e.g., the output 240) based on a signal received from the hidden layer. The hidden layer may be located between the input layer and the output layer and may change a training input of training data received via the input layer to a value that is relatively easily predictable. Input nodes included in the input layer and hidden nodes included in the hidden layer may be connected to each other through connection lines having connection weights. Hidden nodes included in the hidden layer and output nodes included in the output layer may be connected to each other via connection lines having connection weights.

The DNN 230 may input outputs of previous hidden nodes included in a previous hidden layer to a corresponding hidden layer through connection lines having connection weights. The DNN 230 may generate outputs of hidden nodes included in the hidden layer, based on an activation function and values obtained by applying the connection weights to outputs of previous hidden nodes. In an example, when a result of the activation function exceeds a threshold of a current hidden node, an output may be transmitted to a next hidden node. In this example, the current hidden node may remain in an inactive state, instead of transmitting a signal to the next hidden node until reaching a predetermined threshold activation strength through input vectors.

The DNN 230 may train a DNN through, for example, supervised learning. The supervised learning may be a scheme of inputting, to the DNN 230, a training input of training data together with a training output corresponding to the training input and of updating connection weights of connection lines such that output data corresponding to the training output may be output. The training data may include a pair of the training input and the training output.

The DNN 230 may have an extremely large dependence on which environment image is used as an input and may be vulnerable to (e.g., may generate an inaccurate output 240 for) input image changes that are not observed in the training data. The DNN 230 may be vulnerable to, for example, noise caused by extremely small changes in the fingerprint image 210 and/or linear noise appearing at different locations for each device or sensor for obtaining the fingerprint image 210.

Figure 3:
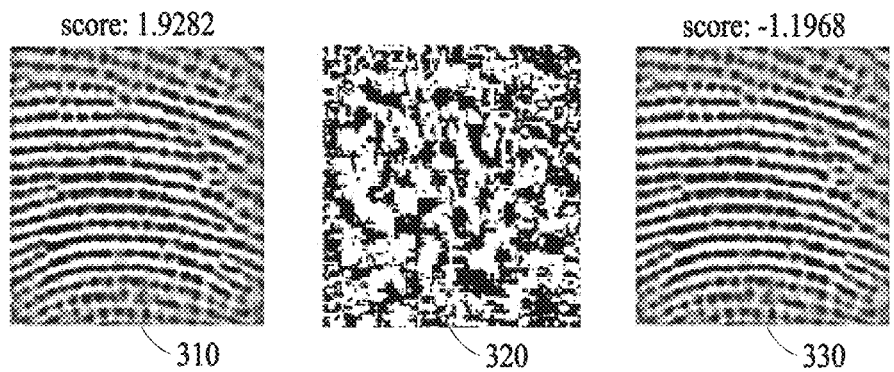
FIG. 3 illustrates an example of deformation due to measurement noise in a fingerprint image.
Figure 4:
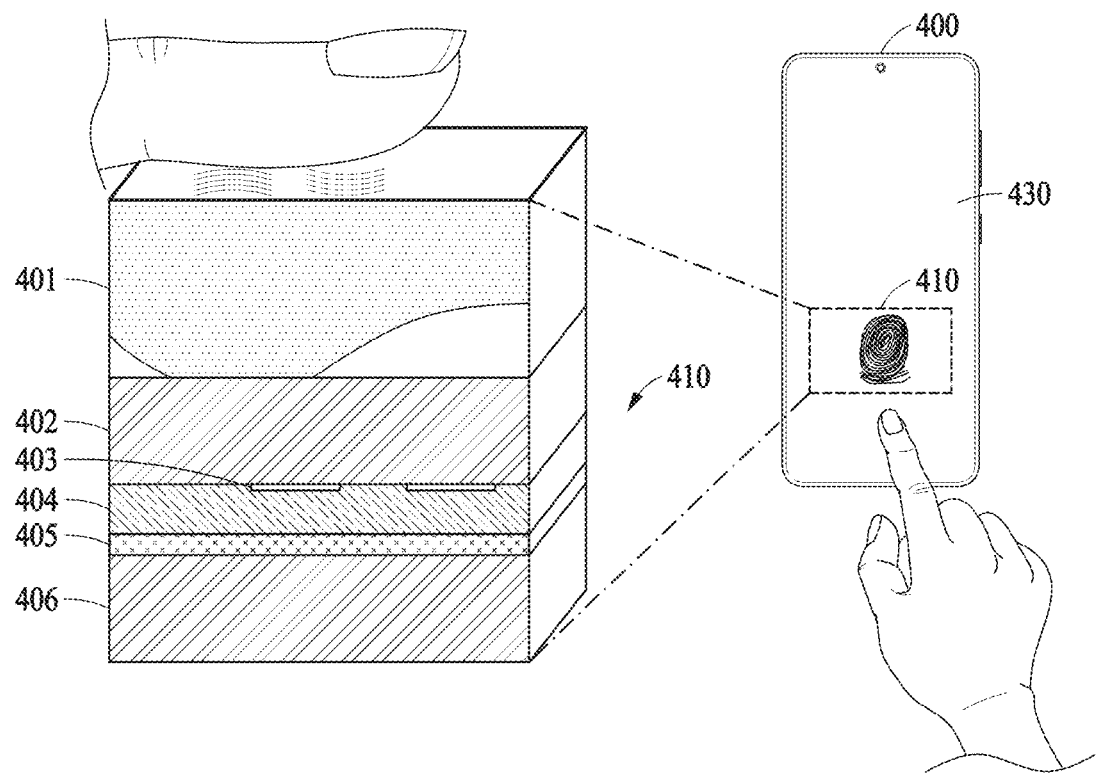
FIG. 4 illustrates an example of deformation due to a device artifact in a fingerprint image.
Figure 4:
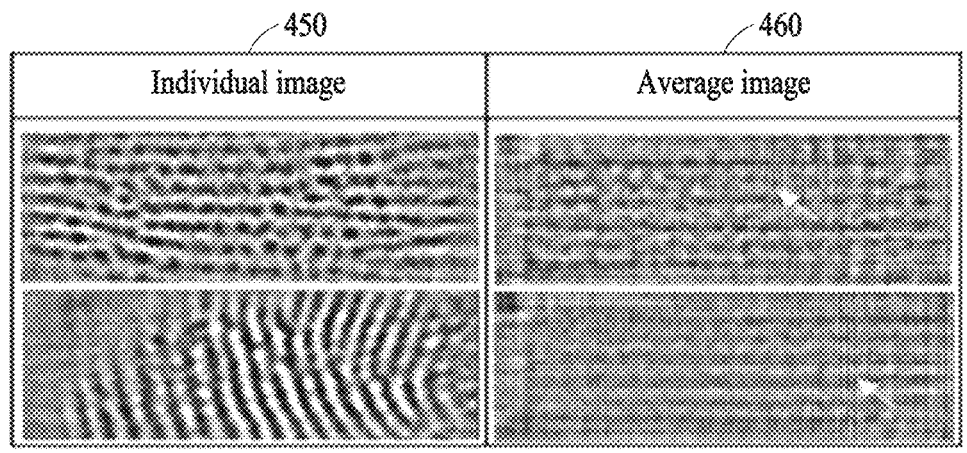

An extremely small change may occur in the fingerprint image 210 in a measurement or detection process, for example, in the measurement or detection process as in a fingerprint image 330 illustrated in FIG. 3, or linear noise and/or impulse noise may be found in different locations from device to device as illustrated in FIG. 4 in an average image 460. In this way, for a typical method not including the preprocessing 220 of one or more embodiments, when the fingerprint image 210 includes noise, a score of the output 240 may be reversed as illustrated in FIG. 3 in the process of the DNN 230 determining whether the fingerprint image 210 is spoofed, resulting in a different result output from the actual one.

In contrast, the DNN 230 may robustly detect whether a deformed fingerprint image 210 due to a variety of noise is spoofed through a method of one or more embodiments including the preprocessing 220 that removes deformation of the fingerprint image caused by the variety of noise, even when the fingerprint image 210 is deformed by the variety of noise that is not learned in the training process for the DNN 230. The deformation of the fingerprint image 210 may be, for example, caused by noise variants due to low-level measurement noise that may occur in a process of measuring or detecting the fingerprint image 210 and/or the DNN 230 may include device variants due to device artifacts that may not be included in the training process, but is not necessarily limited thereto. The device variants may be, for example, linear noise due to a reflected wave caused by a discontinuous surface of a device or sensor for measuring the fingerprint image 210 and/or a scratch on a touch screen, but are not necessarily limited thereto.

The method of one or more embodiments may always remove or suppress low-level measurement noise through the preprocessing 220, and may remove or suppress device artifacts when a device artifact stands out at a preset level or more, thereby improving the efficiency of resources and processing power consumed by the preprocessing 220 while minimizing distortion of the fingerprint image 210, compared to the typical method.

FIG. 3 illustrates an example of deformation due to measurement noise in a fingerprint image. Referring to FIG. 3, a fingerprint image 310, noise 320 applied to the fingerprint image 310, and a fingerprint image 330 deformed due to the noise 320 are illustrated.

For example, when a score indicating whether the fingerprint image 310 is spoofed is calculated (e.g., determined) as 1.9282 and the fingerprint image 310 corresponding thereto is determined to be a live image, and when extremely weak measurement noise such as the noise 320 is added to the fingerprint image 310, the fingerprint image 310 may be deformed like the fingerprint image 330. Extremely weak low-level measurement noise may be referred to as "first noise."

A score of the fingerprint image 330 deformed by the noise 320 may be calculated by the typical method as −1.1968, which is a score indicating whether a fingerprint is spoofed or not, and thus the fingerprint image 330 may be determined as a spoof image. In this way, even though the extremely weak measurement noise, that is, the added noise 320, the scores of the fingerprint image 310 before noise addition and the deformed fingerprint image 330 after noise addition may be reversed. Thus, to solve this technical problem of the typical method, the method of one or more embodiments may always remove extremely weak measurement noise through preprocessing.

FIG. 4 illustrates an example of deformation due to a device artifact in a fingerprint image. Referring to FIG. 4, an example of a structure of a fingerprint sensor 410 mounted on an electronic device 400 to obtain a fingerprint image is illustrated.

A touch display panel 430 may be provided on a front surface of the electronic device 400. The touch display panel 430 may correspond to a touch input interface via which the electronic device 400 may be manipulated. A partial region of the entire region of the touch display panel 430 may also be implemented as a fingerprint sensor 410 for sensing a fingerprint of a fingerprint portion 401 of a user's finger. The fingerprint sensor 410 may include, for example, a passivation layer 402, an insulating layer 404, and a substrate layer 406. A detection electrode (Rx) 403 may be formed between the passivation layer 402 and the insulating layer 404, and a driving electrode (Tx) 405 may be formed between the insulating layer 404 and the substrate layer 406.

The fingerprint sensor 410 may detect different mutual capacitances (i.e., an amount of difference in mutual capacitances) for each of a ridge corresponding to a ridge protruding upward from a fingerprint and a valley corresponding to a valley downward from the fingerprint due to non-uniform light and dark distribution in the fingerprint image, recognize a fingerprint pattern, and identify a user's fingerprint.

In this case, linear noise may be generated in the average image 460 due to a reflected wave generated by an interface and/or other discontinuous surfaces between various layers corresponding to the fingerprint sensor 410 in the touch display panel 430. In addition, small scratches that may occur on a glass and a protective film of the touch display panel 430 may be generated as noise in the fingerprint image (e.g., an individual image 450) obtained by the fingerprint sensor 410. Noise caused by device artifacts (e.g., device noise generated by the fingerprint sensor 410 and/or the touch display panel 430 of the electronic device 400 for obtaining a fingerprint image) may be referred to as "second noise."

For example, extremely small linear noise and impulse noise may be found in different locations in the fingerprint image as in the average image 460 for different electronic devices that obtain a fingerprint image, and even when an individual image 450 contains only a small amount of noise, a typical electronic device may determine scores (e.g., scores indicating whether the fingerprint image is spoofed or not) that are reversed. To solve this technical problem of the typical electronic device, the electronic device 400 of one or more embodiments may process (e.g., preprocess) the fingerprint image to be robust to the noise described above through a preprocessing process to be described hereinafter.

In addition, for the convenience of explanation, the fingerprint sensor 410 is illustrated in FIG. 4 as corresponding to a partial region of the touch display panel 430 in the front of the electronic device 400, but is not necessarily limited thereto. For example, the fingerprint sensor 410 may be implemented in various positions such as a rear surface or a side surface of the electronic device 400 or may be provided in a different region from that of the touch display panel 430.

The electronic device 400 may be a computing device having a fingerprint sensor 410 and may be or include, for example, a personal computer (PC), a laptop, a mobile device, and/or the like, and as well as, an autonomous vehicle, robotics, a smartphone, a tablet device, an augmented reality (AR) device, an Internet of Things (IoT) device, a wearable device, and/or the like, but is not necessarily limited thereto and may correspond to various types of devices.

Figure 5:
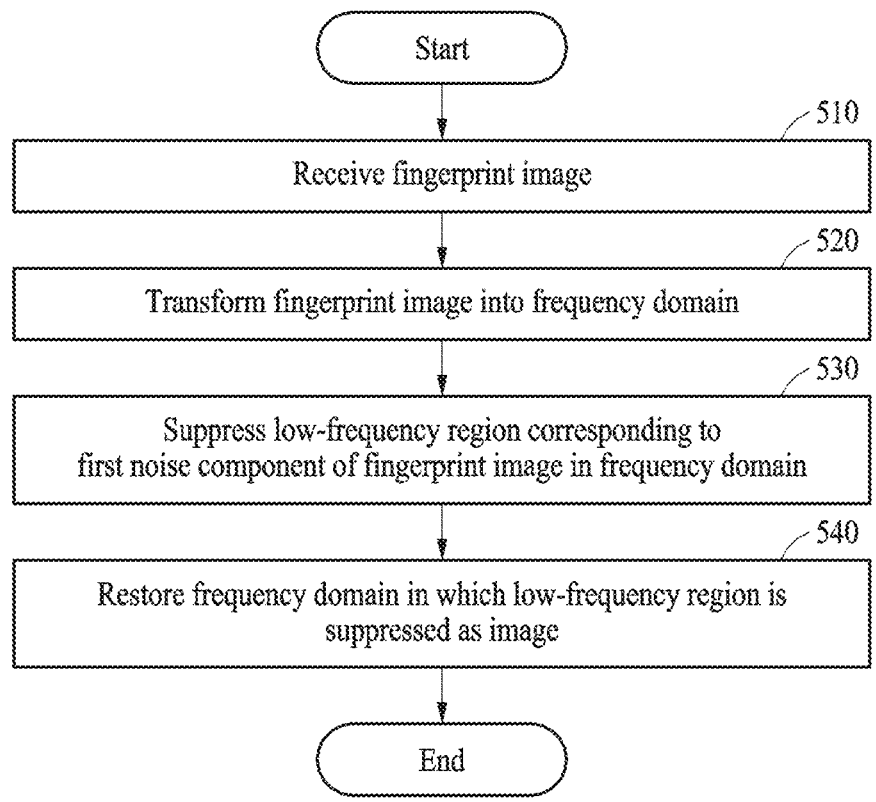
FIG. 5 illustrates an example of a method of preprocessing a fingerprint image.
Figure 6:
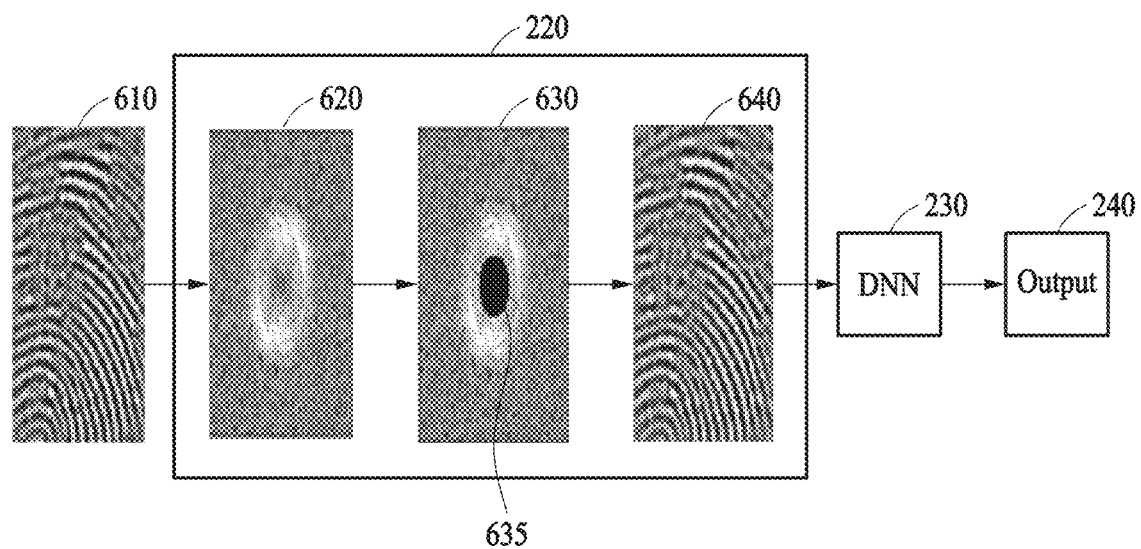
FIG. 6 illustrates an example of a method of preprocessing a fingerprint image.

FIG. 5 illustrates an example of a method of preprocessing a fingerprint image, and FIG. 6 illustrates an example of a method of preprocessing a fingerprint image (e.g., based on the example in FIG. 5). In the following examples, operations may be performed sequentially, but may not be necessarily performed sequentially. For example, the operations may be performed in different orders, and at least two of the operations may be performed in parallel.

Referring to FIGS. 5 and 6, an example of a process of restoring deformation of a fingerprint image 610 by suppressing a first noise component in the fingerprint image 610 through operations 510 to 540 performed by an apparatus for preprocessing a fingerprint image (hereinafter simply referred to as a preprocessing apparatus) is illustrated. The preprocessing apparatus may be, for example, a preprocessing apparatus 1300 illustrated in FIG. 13, but is not necessarily limited thereto.

The preprocessing apparatus may compressively and detectably separate a noise portion of the fingerprint image 610 based on deformation of an original signal for measured noise of a low noise level that may occur and may suppress, mask, or remove the noise portion.

In operation 510, the preprocessing apparatus may receive the fingerprint image 610. The preprocessing apparatus may receive the fingerprint image 610 from a sensor that detects a fingerprint. The sensor may be, for example, an ultrasonic fingerprint sensor that captures a user's fingerprint, an optical fingerprint sensor, an electrostatic fingerprint sensor, and/or an image sensor, but is not necessarily limited thereto. The sensor may be, for example, the sensor 110 illustrated in FIG. 1, the fingerprint sensor 410 illustrated in FIG. 4, and/or the sensor 1310 illustrated in FIG. 13. Alternatively, the preprocessing apparatus may receive the fingerprint image 610 from an enrollment DB through a communication interface (e.g., a communication interface 1370 in FIG. 13). The enrollment DB may be outside of the preprocessing apparatus or may be inside and included in the preprocessing apparatus.

In operation 520, the preprocessing apparatus may transform the fingerprint image 610 received in operation 510 into a frequency domain 620, as illustrated in FIG. 6.

For the convenience of description, an example of transforming the fingerprint image 610 into the frequency domain 620 is described, but is not necessarily limited thereto. The preprocessing apparatus may transform noise in the fingerprint image 610 into various domains that may be decomposed to be detectable.

The preprocessing apparatus may transform the fingerprint image 610 into the frequency domain 620 by, for example, any one of a Fourier transform method and a wavelet transform method. In addition to the Fourier transform method or the wavelet transform method, the preprocessing apparatus may transform a fingerprint image into a frequency domain or another domain by various transformation methods corresponding to statistical noise features included in the fingerprint image. A "wavelet transform" method may be construed to represent a waveform by transforming a locally existing small wavelet into a pattern or represent the waveform through a scale of enlargement or reduction. The wavelet transform method may correspond to a transform method used to represent time and frequency components for a signal of which frequency components change temporally (e.g., a chirp signal, an electrocardiogram an image signal). In the wavelet transform method, a low-frequency component may be represented with a high-frequency resolution, and the high-frequency component may be transformed with a high temporal resolution. A "Fourier transform" method may correspond to a transformation that decomposes a signal into frequency components under the assumption that the signal does not change over time.

In operation 530, the preprocessing apparatus may suppress a low-frequency region 635 corresponding to the first noise component of the fingerprint image among noise components found in the frequency domain 620 transformed in operation 520, as illustrated in FIG. 6 (e.g., a low-frequency region-suppressed frequency domain 630). In the frequency domain 620, a low-frequency region (e.g., the low-frequency region 635) may correspond to a center of the frequency domain 620, and a high-frequency region may correspond to a portion outward from the center of the frequency domain 620.

The preprocessing apparatus may detect the low-frequency region 635 corresponding to the first noise component found in the frequency domain 620. The preprocessing apparatus may compressively sense first noise of the fingerprint image 610 through, for example, the Fourier transform method described above. Here, "compressively sensing" may refer to decomposing the fingerprint image 610 into a domain (e.g., a frequency domain) in which noise is easy to detect and be construed to detect or decompose noise from the transformed frequency domain based on noise simulation performed on the fingerprint image 610.

The preprocessing apparatus may detect and suppress the low-frequency region 635 lower than a frequency band corresponding to a fingerprint region in the frequency domain 620. The preprocessing apparatus may perform masking on the low-frequency region 635 as illustrated in FIG. 6 (e.g., the low-frequency region-suppressed frequency domain 630) by targeting the low-frequency component in the corresponding frequency domain. The preprocessing apparatus may mask the low-frequency region 635 with a statistically representative value. The statistical representative value may be, for example, a representative low power value in a power spectrum of the fingerprint image 610, but is not necessarily limited thereto. Here, a "power spectrum" may be construed to represent power of each frequency corresponding to the fingerprint image. When a waveform that changes over time is given, the power spectrum may correspond to a parameter indicating which frequency component having which size is included in the corresponding waveform. The "representative low power value in the power spectrum" may be, for example, the lowest power value in the power spectrum corresponding to an entire fingerprint image 610 or a power at a position of the low-frequency region 635 in the frequency domain 620, but is not necessarily limited thereto.

When the fingerprint image 610 is transformed to the frequency domain 620, the fingerprint image 610 may exhibit different characteristics from a general image. That is, when the general image is transformed into a frequency domain, a power may be concentrated in a low-frequency region, and thus, an adversarial attack may be concentrated in a high-frequency region. Here, an "adversarial attack" may correspond to an attack that prevents a neural network from operating correctly when noise (or perturbation) of an imperceptible level is applied to an image. In contrast, the fingerprint image 610 may have a power that is intensively distributed in a frequency band corresponding to a region corresponding to a fingerprint (e.g., a fingerprint shape) in the frequency domain 620, and the power may appear weak in the low-frequency region 635 less than a corresponding frequency band and in the high-frequency region greater than a corresponding frequency band. In addition, a statistical analysis may verify the adversarial attack on the fingerprint image 610 to be concentrated in a low-frequency region, unlike a general image.

Thus, the DNN 230 may be robust to the first noise due to the preprocessing apparatus of one or more embodiments detecting and suppressing the low-frequency region 635, which is a portion vulnerable to a noise attack in the frequency domain 620 corresponding to the fingerprint image 610. In this case, the preprocessing apparatus may maintain a phase of the low-frequency region 635 without change.

In operation 540, the preprocessing apparatus may restore the frequency domain, in which the low-frequency region 635 is suppressed in operation 530, as an image 640. The image 640 may correspond to a fingerprint image in which deformation caused by the first noise is restored.

The preprocessing apparatus may apply the restored image 640 to the DNN 230. The DNN 230 may determine whether a fingerprint is spoofed from the restored image 640 and output 240 the determined result.

Figure 7:
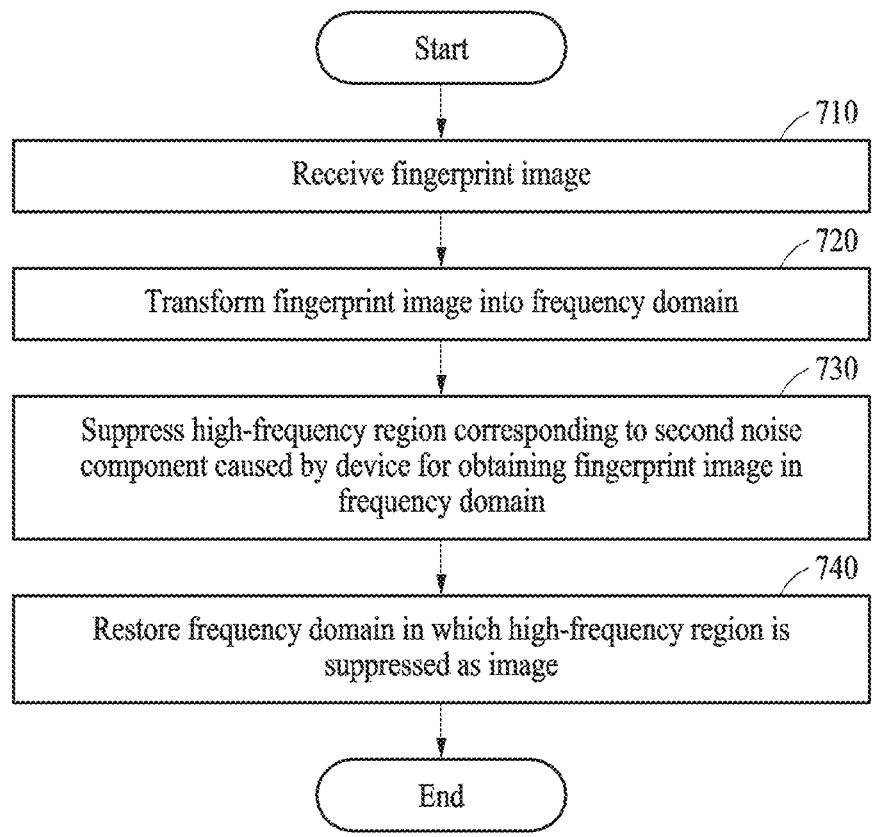
FIG. 7 illustrates an example of a method of preprocessing a fingerprint image.
Figure 8:
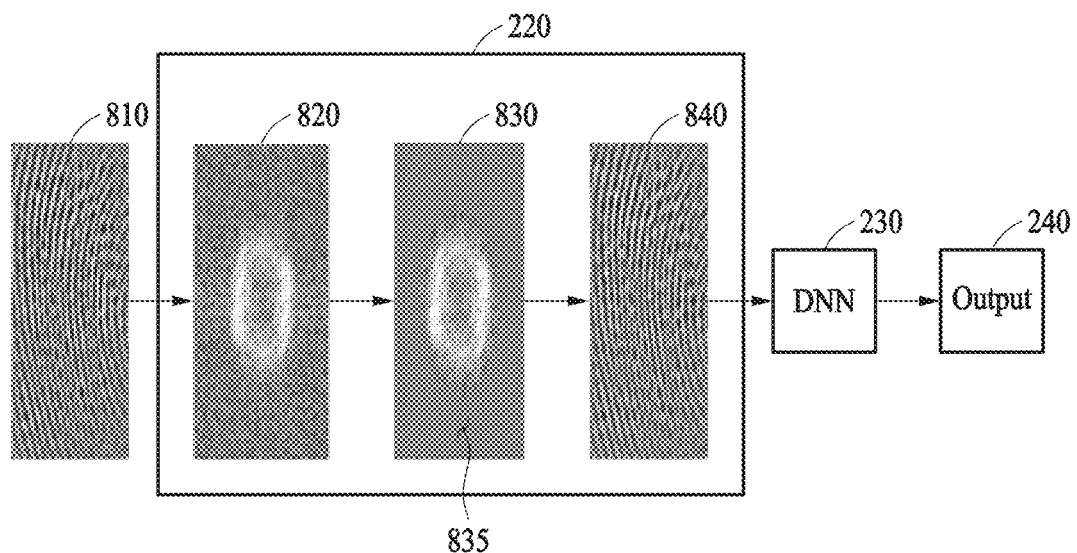
FIG. 8 illustrates an example of a method of preprocessing a fingerprint image.

FIG. 7 illustrates an example of a method of preprocessing a fingerprint image, and FIG. 8 illustrates an example of a method of preprocessing a fingerprint image (e.g., based on the example in FIG. 7). In the following examples, operations may be performed sequentially, but may not be necessarily performed sequentially. For example, the operations may be performed in different orders, and at least two of the operations may be performed in parallel.

Referring to FIGS. 7 and 8, an example of a process in which a preprocessing apparatus restores deformation of a fingerprint image 810 by suppressing a second noise component in the fingerprint image 810 through operations 710 to 740 is illustrated.

The preprocessing apparatus may compressively and detectably decompose an artifact portion of the fingerprint image 810 based on deformation of an original signal for a device artifact such that the artifact portion is suppressed or masked. The preprocessing apparatus may mask a high-frequency region in a power spectrum of the fingerprint image 810 with a representative power value (e.g., a median power value) by reflecting an aspect of deformation of the device.

In operation 710, the preprocessing apparatus may receive the fingerprint image 810. The preprocessing apparatus may receive the fingerprint image 810 from a sensor that detects a fingerprint. The sensor may be, for example, an ultrasonic fingerprint sensor that captures a user's fingerprint, an optical fingerprint sensor, an electrostatic fingerprint sensor, and/or an image sensor, but is not necessarily limited thereto. The sensor may be, for example, the sensor 110 illustrated in FIG. 1, the fingerprint sensor 410 illustrated in FIG. 4, and/or the sensor 1310 illustrated in FIG. 13. Alternatively, the preprocessing apparatus may receive the fingerprint image from an enrollment DB through a communication interface (e.g., the communication interface 1370 in FIG. 13). The enrollment DB may be outside of the preprocessing apparatus or may be inside and included in the preprocessing apparatus.

In operation 720, the preprocessing apparatus may transform the fingerprint image 810 received in operation 710 into a frequency domain 820. For the convenience of description, an example of transforming the fingerprint image 810 into the frequency domain 820 is described, but is not necessarily limited thereto. The preprocessing apparatus may transform the fingerprint image 810 into the frequency domain 820 by, for example, any one of a Fourier transform method and a wavelet transform method. In addition to the Fourier transform method or the wavelet transform method, the preprocessing apparatus may transform the fingerprint image 810 into the frequency domain 820 or another domain by various transformation methods corresponding to statistical noise features included in the fingerprint image 810.

In operation 730, the preprocessing apparatus may suppress a high-frequency region 835 corresponding to a second noise component caused by a device, to obtain a fingerprint image as illustrated in FIG. 8 (e.g., a high-frequency region-suppressed frequency domain 830) among noise components found in the frequency domain 820 transformed in operation 720 as a target. Generally, a device artifact may have higher power compared to a power of other high-frequency components at a position in a high-frequency region. Thus, the preprocessing apparatus may mask a power of the high-frequency region 835 that is greater than a frequency band corresponding to a fingerprint shape as median power of the power spectrum of the individual fingerprint image 810. Here, the preprocessing apparatus may maintain a phase of the high-frequency region 835 without changes.

Masking a power of the high-frequency region 835 with the median power of the power spectrum of the individual fingerprint image, and keeping and maintaining a phase unchanged may reduce the device artifact due to a reflected wave caused by various discontinuous surfaces between a device or a sensor for obtaining the fingerprint image 810. Second noise caused by the device artifact may appear as linear noise having a width of one to two pixels in a spatial domain of the fingerprint image 810. In addition, the second noise may simultaneously exhibit high power in the high-frequency region 835 on the power spectrum. The second noise may be positioned in a section in the high-frequency region 835 based on a form and/or an aspect of the linear noise on the power spectrum. The preprocessing apparatus may mask and quickly remove the entire high-frequency region 835 without separately detecting a section in the high-frequency region 835.

Masking the high-frequency region 835 by the preprocessing apparatus of one or more embodiments may be, for example, improving robustness against a noise attack such as an adversarial attack, thereby improving a spoofing prevention ability of the DNN 230 for the fingerprint image 810.

In addition, a distortion of the fingerprint image 810 may be reduced by masking the power of the high-frequency region 835 with the median power of the power spectrum of the individual fingerprint image. The preprocessing apparatus may perform masking using the median power as a representative power level in the high-frequency region 835. Most of the power in the high-frequency region 835 may be preserved by using and masking the median power. However, abnormally high power due to the device artifact may be suppressed through masking because the power is rapidly lowered in a higher frequency band (e.g., the high-frequency region 835) than a frequency region corresponding to the shape of the fingerprint.

That is, the preprocessing apparatus may detect the high-frequency region 835 corresponding to the second noise component in the frequency domain 820 and suppress the detected high-frequency region 835. The preprocessing apparatus may detect the high-frequency region 835 higher than the frequency band corresponding to a fingerprint region based on variants of the fingerprint image caused by the device, that is, based on an aspect of deformation of the device obtaining the fingerprint in the frequency domain 820. The preprocessing apparatus may mask the power of the high-frequency region 835 with a median power value of a power spectrum of the fingerprint image 810. Here, the median power value may correspond to, for example, a power in a position (e.g., a center position) of the high-frequency region 835 in the frequency domain 820, but is not necessarily limited thereto.

In operation 740, the preprocessing apparatus may restore the frequency domain, in which the high-frequency region 835 is suppressed in operation 730, as an image 840. The image 840 may correspond to a fingerprint image in which deformation caused by the second noise is restored.

The preprocessing apparatus may apply the restored image 840 to the DNN 230. The DNN 230 may determine whether the fingerprint is spoofed from the restored image 840 and output 240 the determined result.

Figure 9:
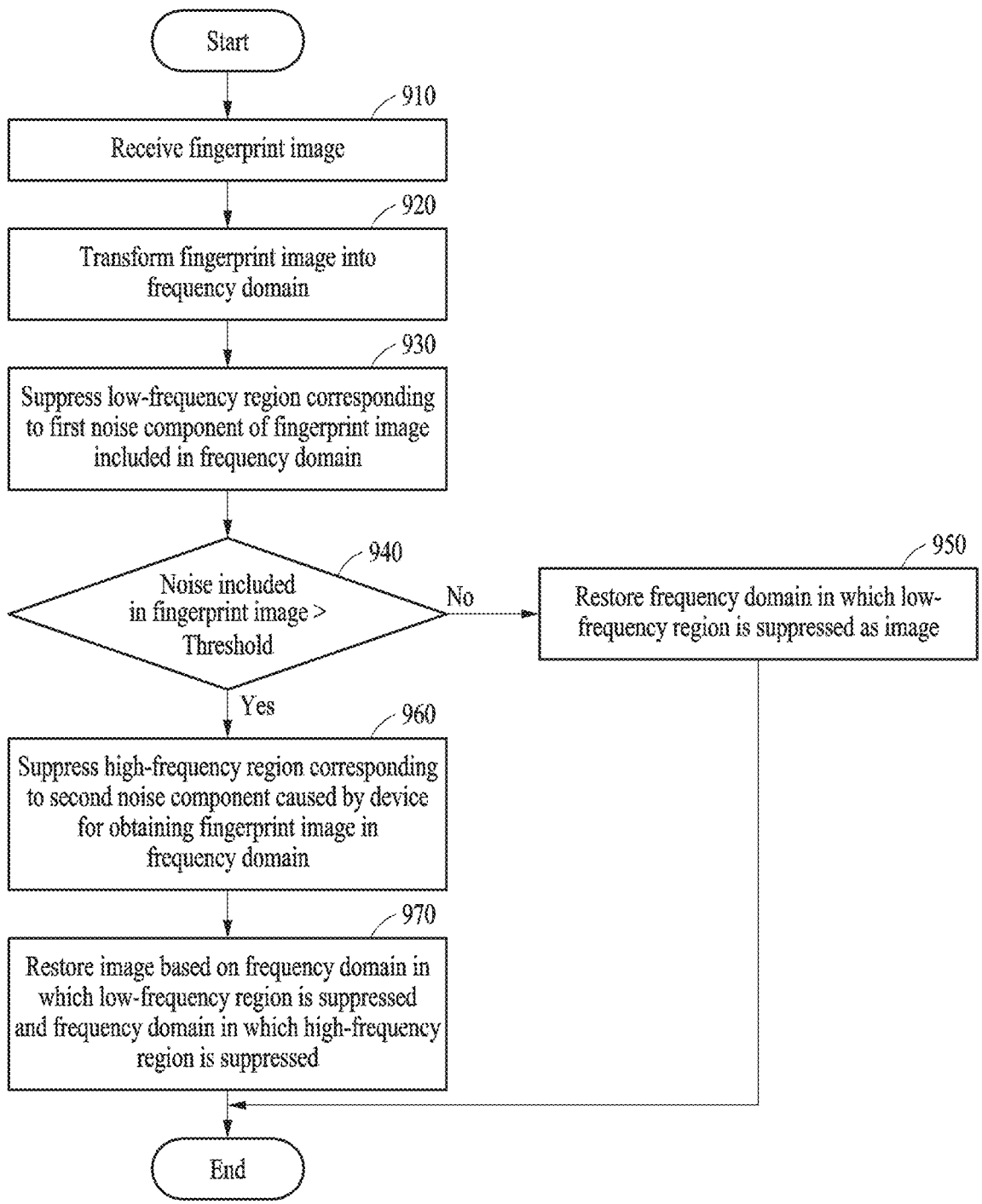
FIG. 9 illustrates an example of a method of preprocessing a fingerprint image.
Figure 10:
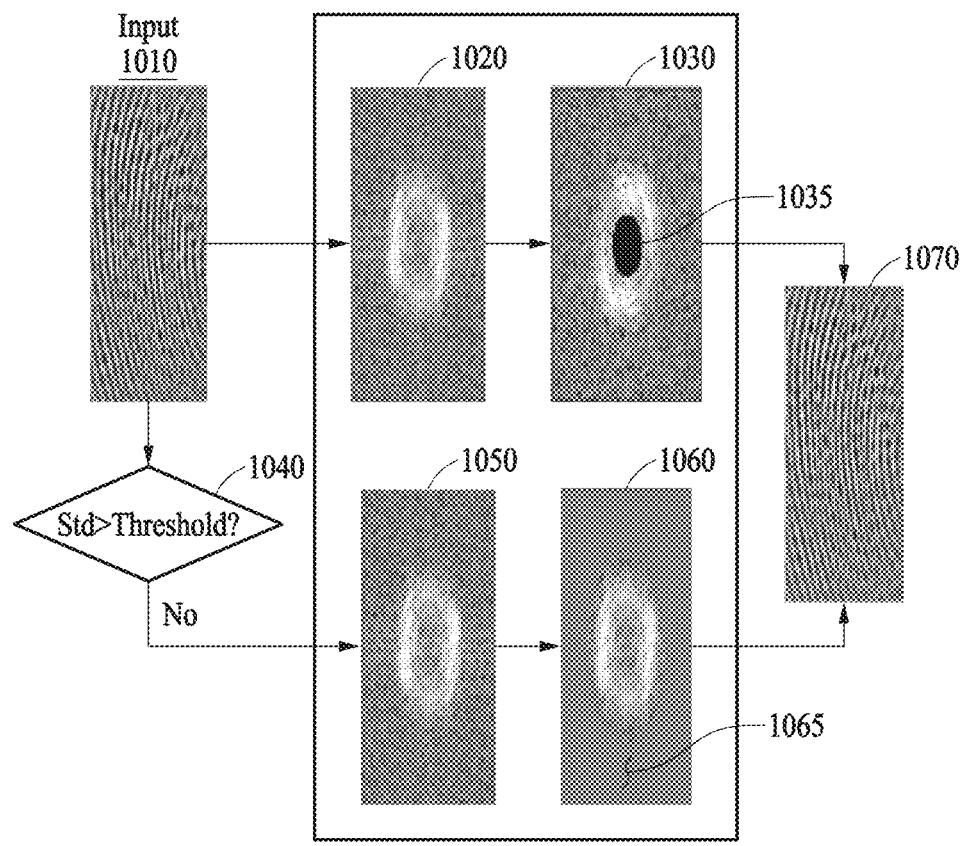
FIG. 10 illustrates an example of a method of preprocessing a fingerprint image.

FIG. 9 illustrates an example of a method of preprocessing a fingerprint image, and FIG. 10 illustrates an example of a method of preprocessing a fingerprint image (e.g., based on the example in FIG. 9). In the following examples, operations may be performed sequentially, but may not be necessarily performed sequentially. For example, the operations may be performed in different orders, and at least two of the operations may be performed in parallel.

Referring to FIGS. 9 and 10, an example of a process of restoring deformation of a fingerprint image 1010 by suppressing a first noise component and a second noise component in the fingerprint image 1010 through operations 910 to 970 performed by a preprocessing apparatus is illustrated. In FIG. 9, operations 910 to 930 may correspond to operations 510 to 530 in FIG. 5, and operation 960 may correspond to operation 730 in FIG. 7. Thus, operations are described in detail with reference to the accompanying descriptions.

In operation 910, the preprocessing apparatus may receive an input image 1010.

In operation 920, the preprocessing apparatus may transform the fingerprint image 1010 received in operation 910 into a frequency domain 1020.

In operation 930, the preprocessing apparatus may suppress a low-frequency region 1035 corresponding to a first noise component of the fingerprint image in the frequency domain 1020 transformed in operation 920, as illustrated in FIG. 10 (e.g., a drawing 1030).

In operation 940, the preprocessing apparatus may determine 1040 whether noise in the fingerprint image 1010 is greater than a threshold.

The preprocessing apparatus may use a standard deviation (Std) of pixel values as an index to obtain a signal-to-noise ratio (SNR) of the fingerprint image 1010. The preprocessing apparatus may selectively process second noise for the fingerprint image 1010 having an SNR higher than a predetermined reference (e.g., a threshold). When the SNR is lower than the predetermined reference (e.g., a threshold), the preprocessing apparatus may suppress a noise portion as a result of statistically analyzing a signal deformation for noise having a low noise level.

Alternatively, when the SNR is higher than the predetermined reference, that is, when a power corresponding to a fingerprint region in the corresponding fingerprint image 1010 is low and there is abundant noise throughout the image, the preprocessing apparatus may preprocess both first noise and second noise caused by a device artifact.

As described above, since a DNN is vulnerable to noise that has not been learned in advance, noise vulnerability to a corresponding output may continue to be inherent when the output is being learned after the preprocessing. Thus, a distortion of the fingerprint image may be minimized by suppressing or masking noise that has not been learned in advance.

For example, the preprocessing apparatus may determine whether noise in the fingerprint image 1010 is greater than a threshold based on whether the standard deviation (Std) of pixel values of the fingerprint image 1010 is greater than the threshold. For example, when the fingerprint image 1010 is a clear image with low noise, a difference between black pixel values and white pixel values may be great. In contrast, when the fingerprint image 1010 is a blurry image with high noise, a difference between the black pixel values and the white pixel values may not be great.

In operation 940, when the noise is determined to be less than or equal to the threshold, the preprocessing apparatus may restore the frequency domain 1030, in which the low frequency region 1035 is suppressed, as an image 1070 in operation 950 and end the operation.

Otherwise, in operation 940, when the noise is determined to be greater than the threshold, the preprocessing apparatus may transform the fingerprint image 1010 into a frequency domain 1050, and a high-frequency region 1065 corresponding to the second noise component in the frequency domain 1050, as illustrated in FIG. 10 (e.g., an image 1060), may be suppressed in operation 960. The preprocessing apparatus may suppress the high-frequency region 1065 corresponding to the second noise component as illustrated in FIG. 10 (e.g., the image 1060) in the frequency domain 1020 transformed in operation 920.

In operation 970, the preprocessing apparatus may restore an image 1070 based on a frequency domain in which the low-frequency region 1035 is suppressed as illustrated in FIG. 10 (e.g., the frequency domain 1030) in operation 930 and a frequency domain in which the high-frequency region 1065 is suppressed as illustrated in FIG. 10 (e.g., the image 1060) in operation 960. The preprocessing apparatus may restore the image 1070 from a result of combining, for example, the frequency domain in which the low-frequency region 1035 is suppressed as illustrated in FIG. 10 (e.g., the frequency domain 1030) and with the frequency domain in which the high-frequency region 1065 is suppressed as illustrated in FIG. 10 (e.g., the image 1060).

When the noise is less than or equal to the threshold, the restored image 1070 may correspond to a fingerprint image in which the deformation caused by the first noise is restored, and when the noise is greater than the threshold, the restored image 1070 may correspond to a fingerprint image in which the deformation caused by the first noise and the second noise is restored.

The preprocessing apparatus may apply the restored image 1070 to the DNN. The DNN may determine whether a fingerprint is spoofed from the restored image 1070 and output the determined result.

Figure 11:
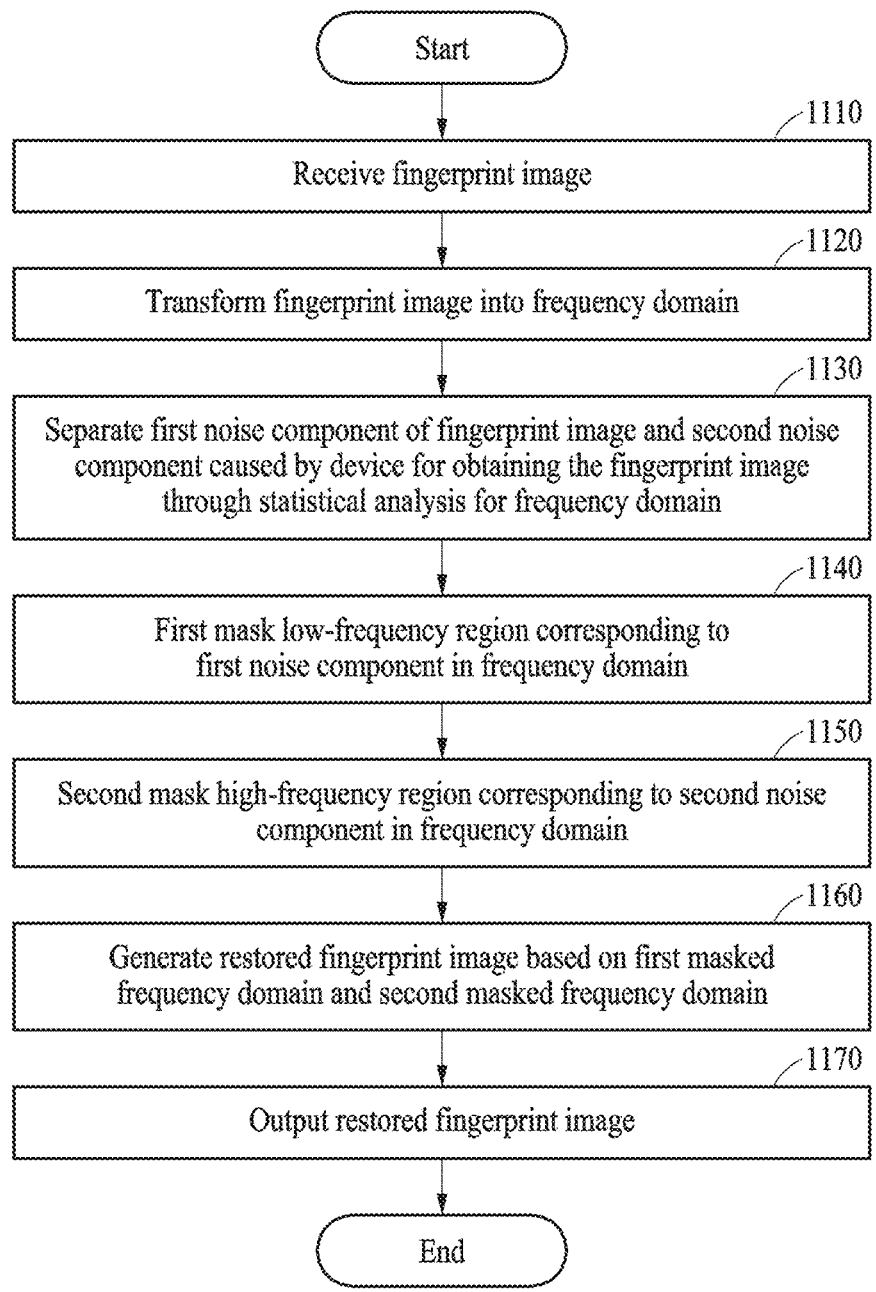
FIG. 11 illustrates an example of a method of preprocessing a fingerprint image.

FIG. 11 illustrates an example of a method of preprocessing a fingerprint image. In the following examples, operations may be performed sequentially, but may not be necessarily performed sequentially. For example, the operations may be performed in different orders, and at least two of the operations may be performed in parallel.

Referring to FIG. 11, an example of a process of restoring a fingerprint image by suppressing a first noise component in the fingerprint image through a preprocessing apparatus through operations 1110 to 1170 is illustrated.

In operation 1110, the preprocessing apparatus may receive a fingerprint image.

In operation 1120, the preprocessing apparatus may transform the fingerprint image received in operation 1110 into a frequency domain.

In operation 1130, the preprocessing apparatus may separate the first noise component of the fingerprint image from a second noise component caused by a device for obtaining the fingerprint image through a statistical analysis on the frequency domain transformed in operation 1120.

In operation 1140, the preprocessing apparatus may first mask a low-frequency region corresponding to the first noise component separated in operation 1130 in the frequency domain. The preprocessing apparatus may first mask the low-frequency region having a lower frequency than a frequency band corresponding to a fingerprint region in the frequency domain with a statistical representative value.

In operation 1150, the preprocessing apparatus may second mask a high-frequency region corresponding to the second noise component separated in operation 1130 in the frequency domain. The preprocessing apparatus may second mask a power of the high-frequency region having a higher frequency than a frequency band corresponding to the fingerprint region in the frequency domain with a statistical representative value. Here, the statistical representative value may correspond to, for example, median power value of a power spectrum of a fingerprint image. The median power value may correspond to a power in a position (e.g., a middle position) of the high-frequency region in the frequency domain.

In operation 1160, the preprocessing apparatus may generate a restored fingerprint image based on the first masked frequency domain in operation 1140 and the second masked frequency domain in operation 1150.

In operation 1170, the preprocessing apparatus may output the input image restored in operation 1160.

Figure 12:
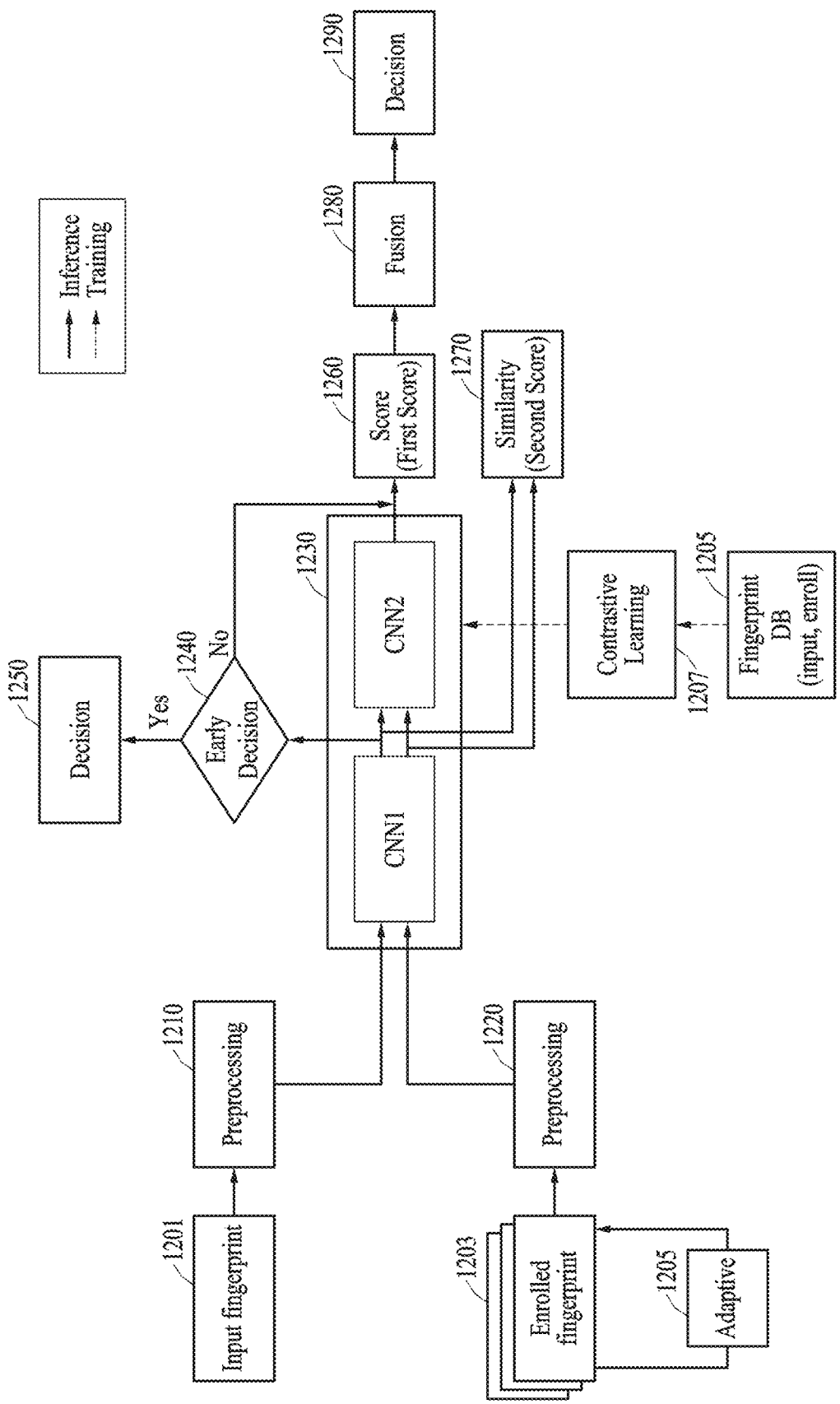
FIG. 12 illustrates an example of a structure and operation of a spoofing prevention system including a preprocessing apparatus.

FIG. 12 illustrates an example of a structure and operation of a spoofing prevention system including a preprocessing apparatus. Referring to FIG. 12, an example of a structure and operations of a spoofing prevention system 1200 including a preprocessing apparatus is illustrated.

The spoofing prevention system 1200 may include preprocessing modules 1210 and 1220, a neural network 1230, an early determination module 1240, a determination module 1250, a score calculation module 1260, a similarity calculation module 1270, a fusion module 1280, and a spoofing determination module 1290.

The preprocessing modules 1210 and 1220 may receive input fingerprint images 1201 and 1203 and may improve robustness of the neural network 1230 against possible noise including a device artifact and measurement noise. That is, the preprocessing module 1210 may preprocess deformation caused by noise in the input fingerprint image 1201 that is newly applied for user authentication or fingerprint authentication and restore the input fingerprint image 1201. After the deformation of the input fingerprint image 1201 is restored, the preprocessing module 1210 may apply a restored input fingerprint image 1201 to the trained neural network 1230 to determine whether a fingerprint is spoofed or not.

In addition, the preprocessing module 1220 may restore deformation caused by noise in the enrolled fingerprint image 1203 used for fingerprint enrollment. In this case, the enrolled fingerprint image 1203 may be, for example, an enrolled fingerprint image that is adaptively processed according to various environments including a state of a dry fingerprint, a moist environment, a low temperature environment, but is not necessarily limited thereto.

After the deformation of the enrolled fingerprint image 1203 is restored, the preprocessing module 1220 may apply the restored enrolled fingerprint image 1203 to the trained neural network 1230 to determine whether the fingerprint is spoofed or not.

The neural network 1230 may be, for example, trained by contrastive learning 1207 based on enrolled fingerprint images stored in a fingerprint DB 1205, but is not necessarily limited thereto. The neural network 1230 may include, for example, a convolutional neural network (CNN) 1 and a CNN 2.

The neural network 1230 may extract first feature information from the input fingerprint image 1201 preprocessed by the preprocessing module 1210. The score calculation module 1260 may calculate a first score corresponding to the first feature information extracted from the neural network 1230. The first feature information may include, for example, a static feature related to the user's biometric information and a dynamic feature based on images related to the biometric information, but is not necessarily limited thereto.

The early determination module 1240 may determine early whether the input fingerprint image 1201 corresponds to a spoofed fingerprint based on the first score calculated by the score calculation module 1260.

For example, the early determination module 1240 may determine whether the fingerprint is spoofed based on whether the first score calculated by the score calculation module 1260 is in a first threshold range. The early determination module 1240 may determine early whether the fingerprint is spoofed based on the first score corresponding to the input fingerprint image 1201.

When it is determined that the first score falls within the first threshold range, the early determination module 1240 may classify whether the first score falls within the range in which biometric information is determined as live information or is in the range in which biometric information is determined as spoof information. In this case, the early determination module 1240 may determine whether the biometric information is spoofed by performing a binary decision between live or spoof based on the first score.

The determination module 1250 may output whether spoofing is determined by the early determination module 1240.

For example, when the first score does not immediately determine whether spoofing is determined, the spoofing prevention system 1200 may determine whether the biometric information is spoofed using both the first score and second score calculated by the similarity calculating module

1270. The similarity calculation module 1270 may calculate the second score based on a similarity between the input fingerprint image 1201 and the enrolled fingerprint image 1205.

The neural network 1230 may determine whether to fuse the first score and the second score and fuse the first score and the second score by the fusion module 1280 based on the determination on whether to fuse or not. For example, the neural network 1230 may determine whether to fuse the first score and the second score based on whether the first score is in a second threshold range in which the confidence thereof is accepted.

When the spoofing is not immediately determined based on the first score, the spoofing prevention system 1200 may fuse the first score calculated by the score calculation module 1260 and the second score calculated by the similarity calculation module 1270 through the fusion module 1280 and determine spoofing based on the fused score.

The spoofing determination module 1290 may finally determine whether the fingerprint is spoofed based on the score fused by the fusion module 1280.

The spoofing determination module 1290 may detect whether the biometric information is spoofed based on the score fused by the fusion module 1280. The spoofing determination module 1290 may determine whether biometric information is spoofed based on a result of comparing the fused score with a preset threshold. In addition, the spoofing determination module 1290 may authenticate a user based on the similarity between the input fingerprint image 1201 and enrolled fingerprints displayed on the enrolled fingerprint image 1203.

The spoofing determination module 1290 may output a result of the detected spoofing.

Figure 13:
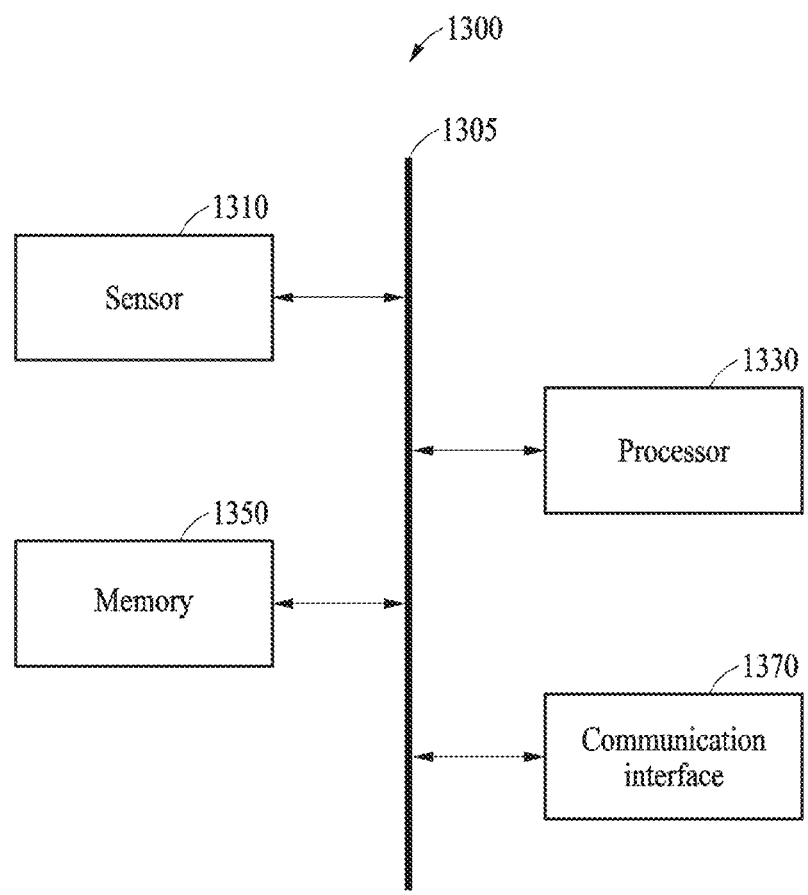
FIG. 13 illustrates an example of a preprocessing apparatus for preprocessing a fingerprint image.

FIG. 13 illustrates an example of a preprocessing apparatus for preprocessing a fingerprint image. Referring to FIG. 13, a preprocessing apparatus 1300 may include a sensor 1310 (e.g., one or more sensors), a processor 1330 (e.g., one or more processors), a memory 1350 (e.g., one or more memories), and a communication interface 1370. The sensor 1310, the processor 1330, the memory 1350, and the communication interface 1370 may be connected to each other through a communication bus 1305.

For example, the preprocessing apparatus 1300 may be implemented as at least a part of a mobile device such as a mobile phone, a smartphone, a personal digital assistant (PDA), a netbook, a tablet computer or a laptop computer, a wearable device such as a smart watch, a smart band or smart glasses, a computing device such as a desktop or a server, a home appliance such as a television, a smart television or a refrigerator, a security device such as a door lock, or a vehicle such as a smart vehicle.

The sensor 1310 may detect a fingerprint image. The sensor 1310 may be, for example, an ultrasonic fingerprint sensor that captures a user's fingerprint, an optical fingerprint sensor, an electrostatic fingerprint sensor, and/or an image sensor.

The processor 1330 may transform the fingerprint image detected by the sensor 1310 into a frequency domain. The processor 1330 may suppress a low-frequency region corresponding to a first noise component of the fingerprint image in the frequency domain. The processor 1330 may restore the frequency domain, in which the low-frequency region is suppressed, as an image. The processor 1330 may perform any one, any combination of any two or more, or all of the operations and methods described herein with reference to FIGS. 1 to 12.

The processor 1330 may execute instructions included in the memory 1350. The processor 1330 may execute a program and control the preprocessing apparatus 1300. Code of the program executed by the processor 1330 may be stored in the memory 1350.

The memory 1350 may store a variety of information generated by processing process by the processor 1330 described above. In addition, the memory 1350 may store a variety of data and various programs. The memory 1350 may include a volatile memory or a non-volatile memory. The memory 1350 may include a large-capacity storage medium such as a hard disk to store the variety of data. The memory 1350 may be a non-transitory computer-readable storage medium storing instructions that, when executed by the processor 1330, configure the processor 1330 to perform any one, any combination of any two or more, or all of the operations and methods described herein with reference to FIGS. 1 to 12.

The communication interface 1370 may output an image restored by the processor 1330.

In addition, the processor 1330 may perform any one or more methods described with reference to FIGS. 1 to 12 or a scheme corresponding to the any one or more method aboves. The processor 1330 may be a hardware-implemented processing device having a physically structured circuit to execute desired operations. For example, the desired operations may include instructions or code in a program. The hardware-implemented preprocessing apparatus 1300 may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The electronic devices, sensors, passivation layers, detection electrodes, insulating layers, driving electrodes, substrate layers, fingerprint sensors, touch display panels, preprocessing apparatuses, communication buses, processors, memories, communication interfaces, electronic device 100, sensor 110, electronic device 400, passivation layer 402, detection electrode (Rx) 403, insulating layer 404, driving electrode (Tx) 405, substrate layer 406, fingerprint sensor 410, touch display panel 430, preprocessing apparatus 1300, communication bus 1305, sensor 1310, processor 1330, memory 1350, communication interface 1370, and other apparatuses, units, modules, devices, and components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with image preprocessing, the method comprising:
 transforming a fingerprint image into a frequency domain;
 suppressing a low-frequency region corresponding to a first noise component of the fingerprint image in the frequency domain;
 determining, by comparing noise comprised in the fingerprint image to a threshold, whether to suppress a high-frequency region of the fingerprint image in the frequency domain; and
 restoring the frequency domain, in which either the low-frequency region or the low-frequency region and the high-frequency region is suppressed, as an image.

2. The method of claim 1, further comprising receiving the fingerprint image.

3. The method of claim 1, wherein the transforming comprises:
transforming the fingerprint image into the frequency domain by a transformation method that matches statistical noise features in the fingerprint image.

4. The method of claim 1, wherein the transforming comprises:
transforming the fingerprint image into the frequency domain by either one or both of a Fourier transform method and a wavelet transform method.

5. The method of claim 1, wherein the suppressing of the low-frequency region comprises:
detecting the low-frequency region corresponding to the first noise component found in the frequency domain; and
suppressing the detected low-frequency region.

6. The method of claim 5, wherein the detecting of the low-frequency region comprises:
detecting the low-frequency region lower than a frequency band corresponding to a fingerprint region in the frequency domain.

7. The method of claim 5, wherein the suppressing of the low-frequency region comprises:
masking the detected low-frequency region with a statistically representative value.

8. The method of claim 1, further comprising:
determining whether the noise comprised in the fingerprint image exceeds the threshold; and
suppressing the high-frequency region corresponding to a second noise component caused by a device, to obtain the fingerprint image in the frequency domain, in response to the noise exceeding the threshold.

9. The method of claim 8, wherein the determining of whether the noise exceeds the threshold comprises:
determining whether the noise exceeds the threshold based on whether a standard deviation of pixel values of the fingerprint image exceeds the threshold.

10. The method of claim 8, wherein the suppressing of the high-frequency region comprises:
detecting the high-frequency domain corresponding to the second noise component in the frequency domain; and
suppressing the detected high-frequency domain.

11. The method of claim 10, wherein the detecting of the high-frequency region comprises:
detecting the high-frequency domain higher than a frequency band corresponding to a region corresponding to a fingerprint, based on an aspect of variants of the fingerprint image caused by the device in the frequency domain.

12. The method of claim 10, wherein
the suppressing of the high-frequency domain comprises masking a power of the detected high-frequency domain with a median power value of a power spectrum of the fingerprint image,
the median power value corresponds to a power at a position of the high-frequency region in the frequency domain.

13. A non-transitory computer-readable storage medium storing instructions that, when executed by one or more processors, configure the one or more processors to perform the method of claim 1.

14. A processor-implemented method with image preprocessing, the method comprising:
transforming a fingerprint image into a frequency domain;
separating a first noise component of the fingerprint image and a second noise component caused by a device, through a statistical analysis of the frequency domain;
first masking a low-frequency region corresponding to the first noise component in the frequency domain;
second masking a high-frequency region corresponding to the second noise component in the frequency domain, in response to noise comprised in the fingerprint image exceeding a threshold; and
generating a restored fingerprint image based on the first masked frequency domain and the second masked frequency domain.

15. The method of claim 14, further comprising:
receiving the fingerprint image; and
outputting the restored fingerprint image.

16. The method of claim 14, wherein the first masking comprises:
first masking the low-frequency region having a lower frequency than a frequency band corresponding to a fingerprint region in the frequency domain with a statistical representative value.

17. The method of claim 14, wherein the second masking comprises:
masking a power of the high-frequency region having a higher frequency than a frequency band corresponding to a fingerprint region in the frequency domain with a median power value of a power spectrum of the fingerprint image, the median power value corresponding to a power at a position of the high-frequency region in the frequency domain.

18. An apparatus with image preprocessing, the apparatus comprising:
one or more processors configured to:
transform a fingerprint image into a frequency domain;
suppress a low-frequency region corresponding to a first noise component of the fingerprint image in the frequency domain;
determine, by comparing noise comprised in the fingerprint image to a threshold, whether to suppress a high-frequency region of the fingerprint image in the frequency domain; and
restore the frequency domain, in which either the low-frequency region or the low-frequency region and the high-frequency region is suppressed, as an image.

19. The apparatus of claim 18, further comprising:
a sensor configured to detect the fingerprint image; and
a communication interface configured to output the restored image.

20. The apparatus of claim 18, wherein, for the suppressing of the low-frequency region, the one or more processors are configured to:
detect the low-frequency region lower than a frequency band corresponding to a fingerprint region in the frequency domain; and
mask the detected low-frequency region with a statistically representative value.

21. The apparatus of claim 18, wherein the one or more processors are configured to:
determine whether the noise comprised in the fingerprint image exceeds the threshold; and
suppress the high-frequency region corresponding to a second noise component caused by a device, to obtain the fingerprint image in the frequency domain, based on a determination that the noise exceeds the threshold.

22. The apparatus of claim 21, wherein, for the determining of whether the noise exceeds the threshold, the one or more processors are configured to:

determine whether the noise exceeds the threshold based on whether a standard deviation of pixel values of the fingerprint image exceeds the threshold.

23. The apparatus of claim 21, wherein, for the suppressing of the high-frequency region, the one or more processors are configured to:

detect the high-frequency region higher than a frequency band corresponding to a fingerprint region and mask a power of the detected high-frequency region with a median power value of a power spectrum of the fingerprint image, the median power value corresponding to a power at a position of the high-frequency region in the frequency domain, based on an aspect of variants of the fingerprint image caused by a device in the frequency domain.

24. A processor-implemented method with image preprocessing, the method comprising:

suppressing, in response to transforming a biometric image into a frequency domain, a low-frequency region corresponding to a first noise component in the frequency domain;

determining, by comparing noise comprised in the biometric image to a threshold, whether to suppress a high-frequency region corresponding to a second noise component in the frequency domain; and restoring the frequency domain, in which either the low-frequency region or the low-frequency region and the high-frequency region is suppressed, as a restored biometric image.

25. The method of claim 24, wherein the determining of whether to suppress the high-frequency region comprises suppressing the high-frequency region in response to the noise comprised in the biometric image exceeding the threshold; and the restoring of the frequency domain comprises restoring the frequency domain, in which the low-frequency region and the high-frequency region is suppressed, as the restored biometric image.

26. The method of claim 25, wherein the suppressing of the high-frequency region comprises:

determining a signal-to-noise ratio (SNR) of the biometric image based on a standard deviation of pixel values of the biometric image; and suppressing the high-frequency region in response to the SNR exceeding the threshold.

27. The method of claim 24, further comprising determining whether a biometric of the biometric image is spoofed by applying the restored biometric image to one or more neural networks.

28. The method of claim 24, wherein the biometric image is a fingerprint image.

* * * * *